United States Patent [19]
Kersey et al.

[11] Patent Number: 5,319,440
[45] Date of Patent: Jun. 7, 1994

[54] FIBER OPTIC GYROSCOPES WITH DEPOLARIZED LIGHT

[75] Inventors: Alan D. Kersey, Springfield; William K. Burns, Alexandria, both of Va.; Robert P. Moeller, Fort Washington, Md.

[73] Assignee: The United States of America as represented by the Secretary of the Navy, Washington, D.C.

[21] Appl. No.: 934,221

[22] Filed: Aug. 25, 1992

[51] Int. Cl.⁵ .............................................. G01C 19/64
[52] U.S. Cl. ................................................... 356/350
[58] Field of Search ......................................... 356/350

[56] References Cited

U.S. PATENT DOCUMENTS

| | | | |
|---|---|---|---|
| 4,529,312 | 7/1985 | Pavlath et al. | 356/350 |
| 4,556,293 | 12/1985 | Burns et al. | |
| 4,653,917 | 3/1987 | Moeller et al. | 356/350 |
| 4,712,306 | 12/1987 | Cahill et al. | 356/350 X |
| 4,869,592 | 9/1989 | Bergh | 356/350 |
| 4,997,282 | 3/1991 | Pavlath | 356/350 |
| 5,046,848 | 9/1991 | Udd | 356/350 |
| 5,080,488 | 1/1992 | Beuhler et al. | 356/350 |
| 5,245,407 | 9/1993 | Nishiura et al. | 356/350 |

FOREIGN PATENT DOCUMENTS 3115804 11/1982 Fed. Rep. of Germany .

*Primary Examiner*—Vincent P. McGraw
*Attorney, Agent, or Firm*—Thomas E. McDonnell; George Jameson

[57] ABSTRACT

A depolarized fiber optic gyroscope with a detector for detecting a rotation about an axis of rotation and a method therefor is disclosed. The gyroscope includes a depolarized light source for generating the depolarized light; a gyro coil for conducting depolarized light about the axis of rotation, the gyro coil including a coil of a non-polarization preserving fiber having first and second ends; a depolarizer with first and second ports for eliminating birefringence induced scale factor variations caused by the non-polarization preserving fiber, the first port of the depolarizer being coupled to the first end of the gyro coil; and a coupler device for coupling the second end of the gyro coil, the second port of the depolarizer, the detector and the depolarized light source, without utilizing a polarizer.

10 Claims, 15 Drawing Sheets

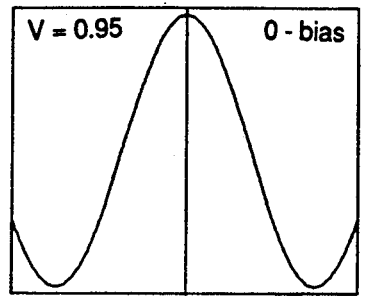
FIG. 2a
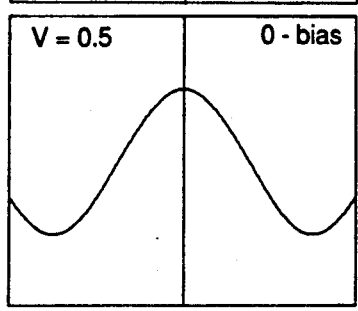
FIG. 2b
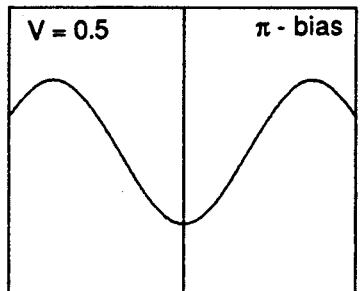
FIG. 2c
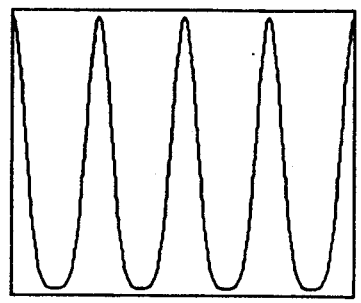
FIG. 2d
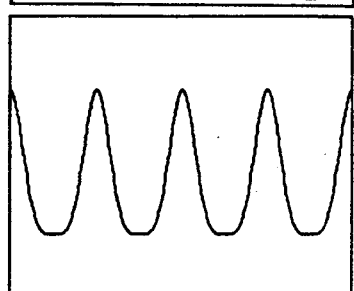
FIG. 2e
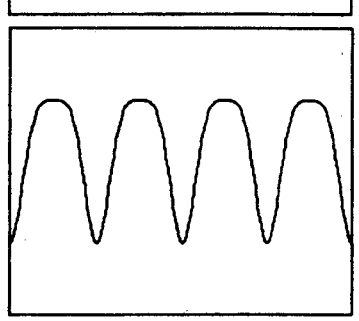
FIG. 2f
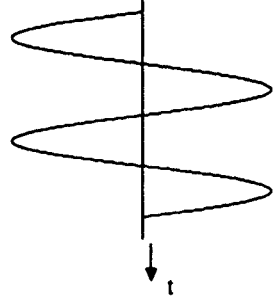
2π pk-pk phase modulation

FIBER OPTIC GYROSCOPES WITH DEPOLARIZED LIGHT

BACKGROUND

1. Field of the Invention

The present invention relates to fiber optic gyroscopes, and in particular to the use of depolarized light in fiber optic gyroscopes without input polarizers, and to the use of ordinary non-polarization preserving fiber in the gyro coil.

2. Discussion of the Related Art

Two events in the development of the fiber optic gyroscope that have been important in obtaining theoretical sensitivity levels and good bias stability have been the recognition of the "minimum configuration" with its unique single mode operation, and the use of polarization preserving fiber to virtually eliminate polarization noise. See S. Ezekiel and H. J. Arditty, in *Fiber-optic Rotation Sensors*. Ed., S. Ezekiel and H. J. Arditty, Springer-Verlag, New York p. 2–26, 1982; and W. K. Burns, R. P. Moeller, C. A. Villarruel and M. Abebe, Opt. Lett. 8, 540 (1983). Nevertheless interest continues to be present to reduce instrument cost for less demanding applications through the use of configurations with reduced component complexity and cost. Today this particularly applies to the use of polarization preserving high birefringence fiber, the cost of which remains high. Alternative configurations include the $3\times 3$ coupler, which passively provides operation at its maximum sensitivity (quadrature) point; and the use of depolarized light in fiber gyros, which was shown theoretically to be equally effective (ideally) in controlling birefringence induced bias drift as the use of polarized light. See S. K. Sheem, Appl. Phys. Lett. 37, 869 (1980); G. A. Pavlath and H. J. Shaw, Applied Optics 21, 1752 (1982); and W. K. Burns, C.-L Chen and R. P. Moeller, J. Lightwave Tech. LT-1, 98 (1983).

The use of depolarized light in fiber optic gyroscopes was first considered by Pavlath and Shaw, cited above, who reported in the ideal case (degree of polarization P=0) that fiber birefringence effects caused a scale factor variation, but that no phase bias was added to the Sagnac phase shift. Similar modeling, which more explicitly included the effects of broad-band sources, appeared in Burns, Chen and Moeller, cited above. The fiber gyro with a $3\times 3$ coupler input led naturally to depolarized operation because the superluminescent diode sources were already only partially polarized, and because a single polarizer could not be used in the physically different input and output paths in the $3\times 3$ coupler configuration. This argument led to the demonstration of reduced polarization noise with reduced degree of polarization in a $3\times 3$ coupler configuration. See W. K. Burns, R. P. Moeller and C. A. Villarruel, Electron. Lett. 18, 648 (1982). A recent variation of this configuration has appeared, where a signal processing scheme is proposed to cope with the birefringence induced scale factor variation. See H. Poisel, G. F. Trommer, W. Buhler, E. Hartl, and R. Muller, Electron. Lett. 26, 69 (1990).

U.S. Pat. No. 4,997,282 to Pavlath generally describes technology components for a depolarized fiber optic gyroscope; however, the gyroscope requires polarizers between a gyro coil and a coupler. U.S. Pat. No. 4,529,312 to Pavlath et al. describes a fiber optic gyroscope including two $2\times 2$ couplers, a gyro coil and a polarizer disposed between one coupler and the gyro coil. U.S. Pat. No. 5,046,848 to Udd describes a fiber optic gyroscope including two $2\times 2$ couplers with a polarizer disposed therebetween. U.S. Pat. No. 4,869,592 to Bergh describes an apparatus for obtaining a measurement and absolute rotation from a closed loop fiber optic gyroscope, the gyroscope having two $2\times 2$ couplers with a polarizer disposed therebetween, and a gyro coil; however, the gyroscope does not disclose a depolarizer disposed between the gyro coil and a coupler. German Patent Publication DE 3115-804 to Bohm et al. described a fiber optic gyroscope having two $2\times 2$ couplers with a polarizer and a depolarizer. U.S. Pat. No. 4,653,917 to Moeller et al. describes a fiber optic gyroscope having a $3\times 3$ coupler, a polarized light source and a gyro coil; however, the gyroscope does not contain a depolarizer connected to the gyro coil. U.S. Pat. No. 5,080,488 to Buehler et al. describes a method for evaluating signals from a fiber optic gyroscope, the gyroscope including a $3\times 3$ coupler and a gyro coil; however, the gyroscope does not contain a depolarizer connected to the gyro coil. U.S. Pat. No. 4,556,293 to Burns et al. describes a broad band unpolarized light source.

SUMMARY OF THE INVENTION

Fiber optic gyroscopes often use expensive components and polarization preserving fiber to achieve high performance. The present invention provides a low cost gyroscope that uses a reduced number of components and can use ordinary single mode fiber that does not preserve optical polarization.

It is an object of this invention to overcome limitations in the prior art. Yet another object of this invention is to provide a low cost fiber optic gyroscope for medium to low grade applications. It is yet another object of the present invention to provide a fiber gyroscope that does not utilize a polarizer. It is yet another object of the present invention to provide a fiber gyroscope capable of using low cost ordinary fiber (non-polarization preserving fiber) with a reduced component count. It is yet another object of the present invention to provide a fiber gyroscope easily matched with naturally depolarized light sources such as a fiber superfluorescent source. It is yet another object of the present invention to avoid sensitivity to magnetic fields without the need for both a polarizer and a depolarizer after the polarizer.

These and other objects are achieved in a depolarized fiber optic gyroscope with a detector for detecting a rotation about an axis of rotation, the depolarized fiber optic gyroscope including a depolarized light source for generating depolarized light; a gyro coil for conducting depolarized light about the axis of rotation, the gyro coil including a coil of a non-polarization preserving fiber having first and second ends; a depolarizer with first and second ports for eliminating birefringence induced scale factor variations caused by the non-polarization preserving fiber, the first port of the depolarizer being coupled to the first end of the gyro coil; and a coupler device for coupling the second end of the gyro coil, the second port of the depolarizer the detector and the depolarized light source, without utilizing a polarizer.

These and other objects are achieved with a depolarization mechanism for a fiber optic gyroscope with a detector for detecting a rotation about an axis of rotation, a depolarized light source and using a non-polarization preserving fiber in a gyro coil having first and second ends, the depolarization mechanism including a depolarizer having first and second ports for eliminating birefringence induced scale factor variations caused by the non-polarization preserving fiber, the first port of the depolarizer being coupled to the first end of the gyro coil; and a coupler device for coupling the second end of the gyro coil, the second port of the depolarizer the detector and the depolarized light source, without utilizing a polarizer.

These and other objects of the present invention are achieved with a method for reducing birefringence induced scale factor variations in a detected signal from a depolarized fiber optic gyroscope having a non-polarization preserving fiber coiled into a gyro coil with first and second ends and a coupler system without a polarizer coupled to the second end of the gyro coil, the method including the steps of coupling a depolarizer between the first end of the gyro coil and the coupler system injecting a depolarized light into the coupler system to form without polarization first and second lights; conducting the first light of the depolarized light from the coupler system through the gyro coil and then through the depolarizer back to the coupler system as a first return light; conducting the second light of the depolarized light from the coupler system through the depolarizer and then through the gyro coil back into the coupler system as a second return light; and detecting the detected signal by superposing the first and second return lights.

BRIEF DESCRIPTION OF THE DRAWINGS

The invention will be described in detail in the following description of preferred embodiments with reference to the following figures wherein:

FIGS. 2a and 2b are graphs of the output intensity signal waveforms versus phase from an open loop gyro driven with a dynamic phase shift of $2\pi$ radians peak to peak for different visibilities and phase bias shifts;

FIG. 2c is a graph of the output signal waveform versus phase from an open loop gyro driven with a dynamic phase shift of $2\pi$ radians peak to peak and illustrating a $\pi$-phase bias shift which produces an inverted fringe relative to the output signal waveforms in FIGS. 2a and 2b;

FIGS. 2d and 2e are graphs of the output intensity signal waveforms versus time from an open loop gyro driven with a dynamic phase shift of $2\pi$ radians peak to peak for different visibilities and phase bias shifts;

FIG. 2f is a graph of the output signal waveform versus time from an open loop gyro driven with a dynamic phase shift of $2\pi$ radians peak to peak and illustrating a $\pi$-phase bias shift which produces an inverted fringe relative to the output signal waveforms in FIGS. 2a and 2b;

DETAILED DESCRIPTION OF PREFERRED EMBODIMENTS

Figure 1:
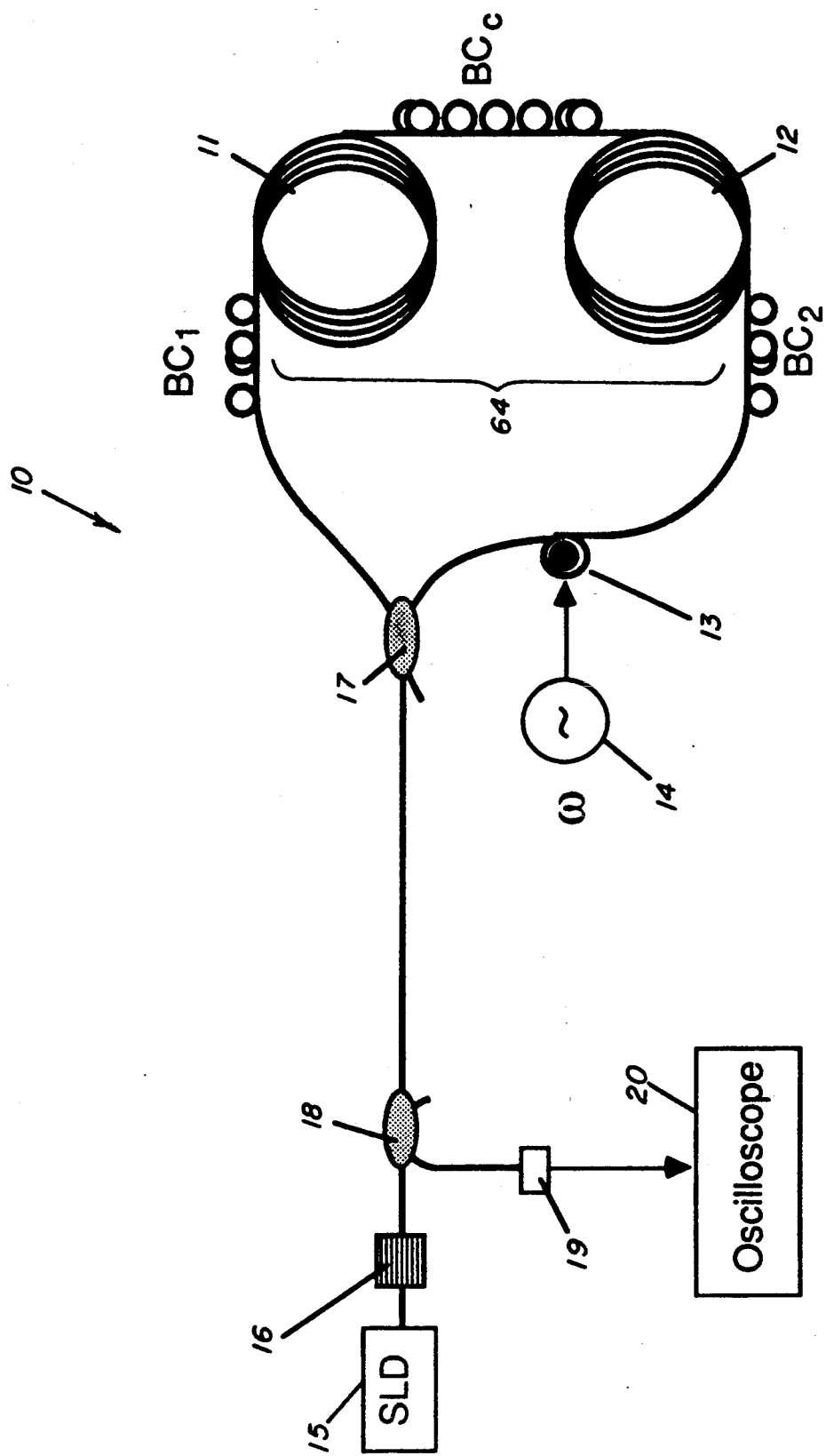
FIG. 1 shows the experimental set-up used for developing the present invention.

Certain experimental observations of birefringence induced scale factor variations appeared not to be explainable by existing models of fiber birefringence. The initial observations were made with a Sagnac interferometer using a 3×3 fiber coupler, after which a 2×2 system was built to investigate the effects in more detail. Then a new four-parameter model for fiber birefringence was developed which explicitly accounts for polarization mode mixing in the middle of the fiber. This model accounts for the experimental observations. In the depolarized case, birefringence induced scale factor variations are eliminated by the use of a depolarizer in the fiber coil. This is analogous to the elimination of polarization fading in the polarized case. For details see K. Bohm, P. Marten, K. Petermann, E. Weidel and R. Ulrich, Electron. Lett. 17, 352 (1981). This result is also predicted theoretically. Experimental observations described below apply equally well to both depolarized 2×2 and 3×3 fiber gyro configurations. This work provides an improved fiber birefringence model which applies to any fiber gyro with ordinary (non-polarization preserving) fiber, and demonstrates the means for elimination of scale factor variation in depolarized gyros, thus enabling the development of low cost fiber gyros which will impact a broad range of rotation measurement requirements.

The experimental system comprised a conventional low birefringence fiber coil, 450 m in length wound on a drum of 1 m circumference. Light from an SLD (super luminescent diode), operating at 820 nm, was depolarized using a fiber Lyot depolarizer, and coupled into the gyro coil using a 2×2 fiber coupler. The output of the gyro was then detected at the reciprocal output via a second coupler. A polarization controller, comprising three fiber fractional waveplates (FFWPs), as discussed in H. C. Lefevre, Electron. Lett. 16, 778 (1980), (FFWP) elements ($\gamma/4,\gamma/2,\gamma/4$), was incorporated at one end of the fiber coil. This device allowed the birefringence properties of the gyro coil to be modified, and facilitated manual adjustment of the contrast ratio of the interferometric output. Operation of the system revealed that adjustment of the FFWPs provided for optimization of the interference visibility or contrast ratio, as predicted in previous analysis. See Pavlath and Shaw, cited above. Furthermore, as predicted previously, changes in the contrast ratio were not accompanied by a gradual bias shift. However, experimentally it was also noticed that by adjustment of the FFWP elements in order to induce a complete fade of the interference signal, an anomalous condition could be generated. This condition appeared as an effectively "inverted" interference output signal, which is an output interference signal $\pi$-shifted from the normal operation, e.g., a birefringence-induced $\pi$-bias offset. In general, it was found that the contrast of this inverted interference signal could be adjusted via the FFWP, but a maximum value less than unity was typically obtained. Further experimental investigation revealed that the maximum contrast ratio of the inverted fringe could be changed by perturbing the fiber in the gyro coil, for example, by moving one or several of the windings of the fiber on the drum.

In order to investigate this phenomenon more closely, a theoretical model based on a three fiber-section description of the gyro fiber coil was developed. To experimentally test this model, the gyro system 10 was rearranged as shown in FIG. 1, to incorporate several birefringence controllers or adjustment elements, $BC_1$, $BC_2$ and $BC_c$. The $BC_1$ and $BC_2$ controllers were located at either end of the gyro coil 64, and the $BC_c$ controller was located at the center of the coil, separating the gyro coil 64 into a first section at 11 and a second section at 12, as shown. Light from SLD 15 was depolarized by depolarizer 16, passed through coupler 18 and coupled into the gyro coil 64 by coupler 17. The gyro coil 64 output passes through coupler 18 to detector 19 which produces a signal observed on oscilloscope 20. The controllers at each end of the coil, $BC_1$ and $BC_2$, were general 3-element ($\gamma/4,\gamma/2,\gamma/4$) devices, whereas the centrally located controller, $BC_c$, comprised six arbitrary fractional-waveplates ranging from approximately $\gamma/8$ to $\gamma/2$.

To observe the fringe contrast and bias offset, the gyro phase was modulated by phase modulator 13 driven by signal source 14 at a rate $\omega$ of 30 kHz using a piezoelectric phase shifter located near one end of the coil. This was driven with a peak-to-peak phase modulation of $2\pi$ radians, which ensured that the full fringe contrast could be determined at the output with the gyro coil in a stationary frame. FIGS. 2a-2c show the form of the gyro output signal generated with a $2\pi$ pk-pk phase modulation for zero phase bias and visibilities of 0.95 (FIG. 2a) and 0.5 (FIG. 2b), and that generated with a $\pi$-phase bias offset and a visibility of 0.5 (FIG. 2c). The inverted form of the gyro output in FIG. 2c, compared to that of FIG. 2b, is indicative of the x-bias offset.

Figure 3:
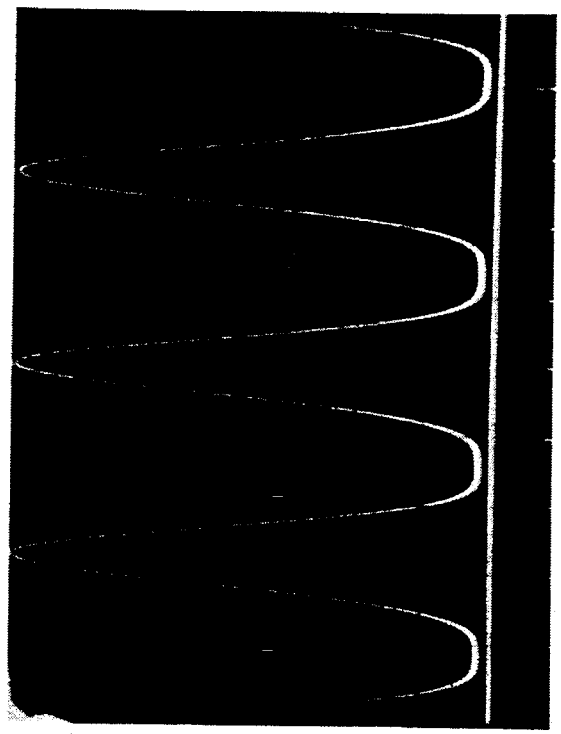
FIG. 3 is a graph of a measured output intensity signal waveform versus time having a maximum visibility recorded for a zero phase bias offset.
Figure 4B:
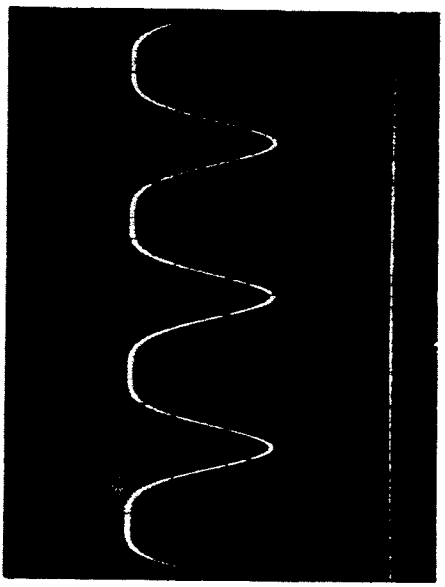
FIGS. 4a–4c are graphs of measured output intensity signal waveforms versus time with an inverted fringe and a 0.37 visibility showing the maximum fringe visibility obtainable for different settings of the end birefringence controllers.
Figure 4C:
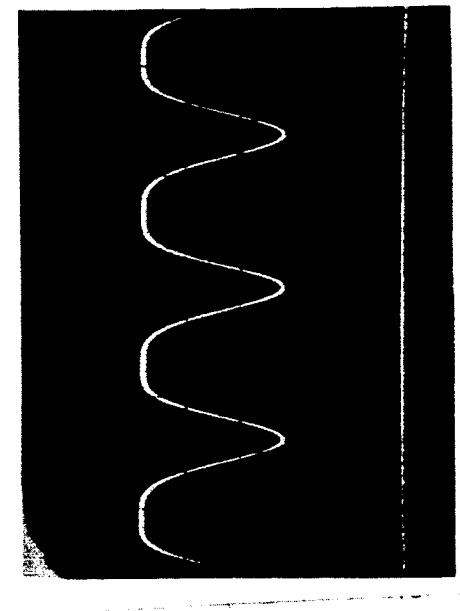
Figure 4A:
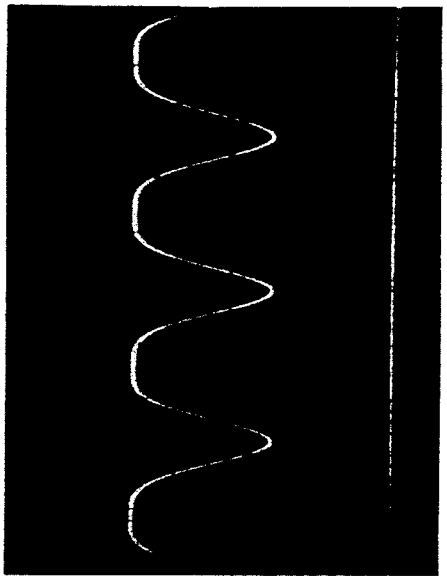

FIG. 3 shows the optimum interference fringe contrast obtained with zero-phase offset; the visibility is >0.97. This condition of maximum visibility and zero-phase offset was relatively easily achieved by adjusting either end controller, $BC_1$ or $BC_2$. No adjustment of the central controller $BC_c$ was required. By further adjustment of one of the birefringence controllers $BC_1$ or $BC_2$, the contrast of the interference signal could be reduced to zero, after which restoration of the contrast by a random movement of one of the end birefringence controller elements produced either a normal or inverted (i.e., $\pi$-phase shifted) fringe signal at the output. When an inverted fringe resulted, the birefringence controller at either end of the coil could be adjusted to optimize the contrast ratio. FIG. 4a shows a typical example of the signal observed; the visibility of the fringes is ~0.37, and as can be seen shows an inverted form relative to that of FIG. 3. Experimentally, it was found that for a particular setting of the birefringence controllers in the center of the coil, the maximum visibility of the inverted fringe which could be achieved via adjustment of $BC_1$ or $BC_2$ was fixed. This is shown in FIGS. 4a-4c. Here, the maximum fringe contrast obtained via adjustment of one controller ($BC_1$), is shown in FIG. 4a. After an arbitrary adjustment of the opposite controller ($BC_2$), further adjustment of the controller $BC_1$ allowed the contrast of the inverted fringe to be recovered with an identical peak contrast, as shown in FIG. 4b. This procedure was repeated in the opposite sense, with the controller $BC_1$ being randomly set, and the inverted fringe being recovered via adjustment of $BC_2$. The maximum fringe visibility of 0.37 again being achieved, as shown in FIG. 4c.

Figure 5B:
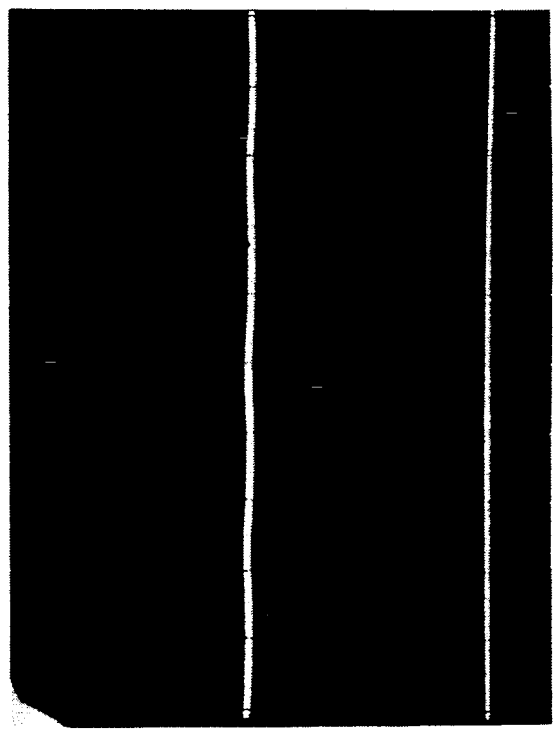
FIG. 5b is a graph of a measured output intensity signal waveform observed fort he lowest fringe contrast factor when the central controllers were adjusted to eliminate the inverted fringe conditions.
Figure 5A:
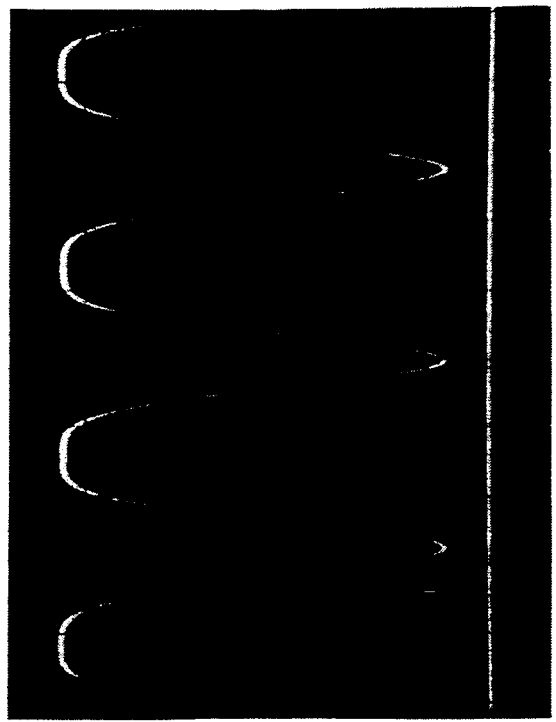
FIG. 5a is a graph of a measured output intensity signal waveform observed for a high visibility with an inverted fringe.

Adjustment of the central controller ($BC_c$) was found to determine the maximum contrast of the inverted fringe obtainable via the controllers $BC_1$ and $BC_2$. FIG. 5a shows a higher contrast ratio (visibility=0.8) for an inverted fringe. This resulted after tedious fine adjustments of the central birefringence controllers in the system, suggesting that the case of a high visibility inverted fringe results from a particular unique combination of birefringence/mode coupling effects in the fiber coil. Indeed, the highest visibility which could be achieved with an inverted fringe was 0.87. The series of experiments described above were repeated, and again it was verified that after random adjustment of $BC_1$, the fringe contrast obtained in FIG. 5a could be recovered via adjustment of $BC_2$, and vice-versa. This type of experiment was repeated numerous times for various settings at the central birefringence adjusters ($BC_c$), and in each case the same behavior was observed. Finally, by adjustment of the centrally located birefringent controllers, a condition was obtained where no inverted fringe could be achieved via adjustment of either $BC_1$ or $BC_2$ (FIG. 5b). Again the above experiment was repeated and, in each case, the same contrast ratio for the inverted fringe was obtained (zero in this case), that is, no fringe inversion could be achieved for any setting of $BC_1$ and $BC_2$.

Figure 6:
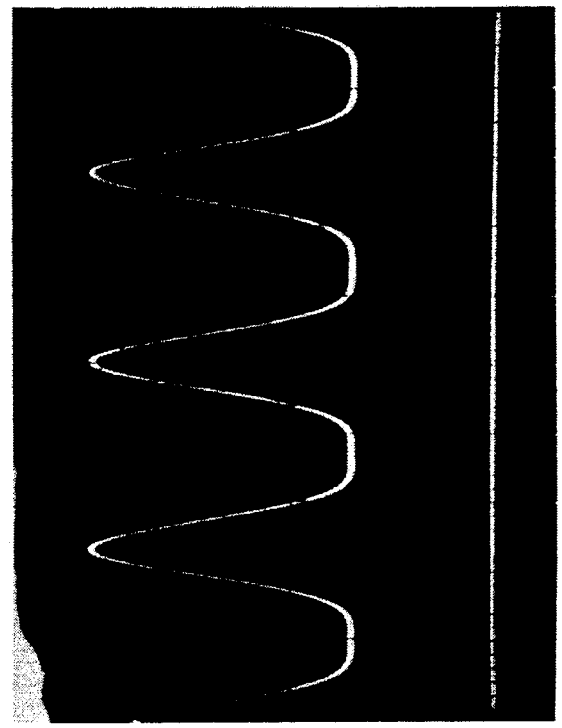
FIG. 6 is a graph of a measured output intensity signal waveform obtained under all settings of the birefringence controllers with a Lyot type depolarizer in the fiber coil.

Also observed was that inclusion of an additional Lyot depolarizer in the fiber coil of the experimental gyro system, for example between modulator 13 and controller $BC_2$, produced an output visibility of 0.5 which remained stable irrespective of adjustments of the various birefringence controllers in the system. This result was independent of the position of the depolarizer in the coil. FIG. 6 shows a typical trace of the output observed in this case.

The well established view of birefringence in ordinary single mode fibers is that bends, twists and imperfections in the fiber induce random birefringences which results in a complicated evolution of the state of optical polarization. See A. Simon and R. Ulrich, Appl. Phys. Lett. 31. 517 (1977). Polarization eigenmodes are the polarization states which can be transmitted through a fiber with constant birefringence without any change in polarization state. In a fiber with constant birefringence, such that polarization eigenmodes can be identified, the effect of additional random fiber birefringences will be to couple power between the eigenmodes. This 20 power coupling has been modeled using coupled power theory, which predicts 50-50 power splitting between the modes in a distance $\sim 1/h$. See I. P. Kaminow, IEEE J. Quantum Electron. OE-17, 15 (1981).

An optical fiber can be modeled as a general birefringence element using Jones matrices. See F. P. Kapron, N. F. Borrelli and D. B. Keck, IEEE J. Quantum Electron. OE-8, 222 (1972). In Jones' theory, for monochromatic light, the input-output polarization behavior of a system of distributed, arbitrary birefringences can be described by two lumped birefringence elements, a linear birefringence element of retardation $\Delta\phi$ (a phase retardation) and fast axis $\theta$ (a fast axis orientation), and a circular birefringence element of rotation $\Omega$. See H. Hurwitz and R. Clark Jones, J. Opt. Soc. Am. 31, 493 (1941). This yields a three parameter model which describes the polarization behavior of a section of fiber of any length. The effect of polarization mode coupling is implicitly contained within this model.

Alternatively, the effect of random fiber birefringences can be modeled by considering each birefringence as a point scattering center which couples power between the polarization eigenmodes. This is a two parameter problem which describes the amplitude and phase of the scattered power. By connecting such scattering matrices with propagation matrices describing propagation between the scattering centers, in principle, propagation in the entire fiber can be described. This approach was taken in Pavlath and Shaw, cited above, where for our depolarized case of interest a birefringence dependent contrast factor, as defined by Poisel, Trommer, Buhler, Hartl and Muller, cited above, was demonstrated. See Pavlath and Shaw, Equation 17. This birefringence dependent contrast factor can be interpreted as a birefringence dependent scale factor. The contrast factor, dependent on two birefringence related parameters, could assume positive and negative values of unity magnitude, but could not account for the experimental differences that we observed, as discussed above, to be associated with these cases. Thus, a more realistic model was needed.

Consider the fiber comprising the fiber coil to have three physically distinguishable parts, with respect to the effect of birefringence on the light propagating through it. At each end of the fiber is a length, less than the mode coupling length $1/h$, which is too short for mode coupling effects to be significant. Each of these end sections are to be described by the three element, lumped birefringence model as discussed above. Thus, assume for section N, a linear birefringence with retardation $\Delta\phi_{ij}$, fast axis $\theta_N$, and a circular birefringence of rotation $\Omega_N$. With this model any mode coupling is accounted for by the magnitude of $\Delta\phi_{ij}$, $\theta_N$ and $\Omega_N$, and the modes i and j are uncoupled. For a sufficiently short section length ($<<1/h$) it is physically true that mode coupling is negligible. In the center section, which is assumed long compared to $1/h$, assume mode coupling dominates such that power is evenly divided between the modes and that continual transfer of power back and forth between the modes occurs. This cyclical coupling allows the assumption that the birefringence of the center section is averaged out and can be neglected. This section is then modeled as an isotropic fiber with a single lumped scattering center whose phase shift on scattering is an unknown , and whose field coupling strength is $1/\sqrt{2}$.

Figure 7A:
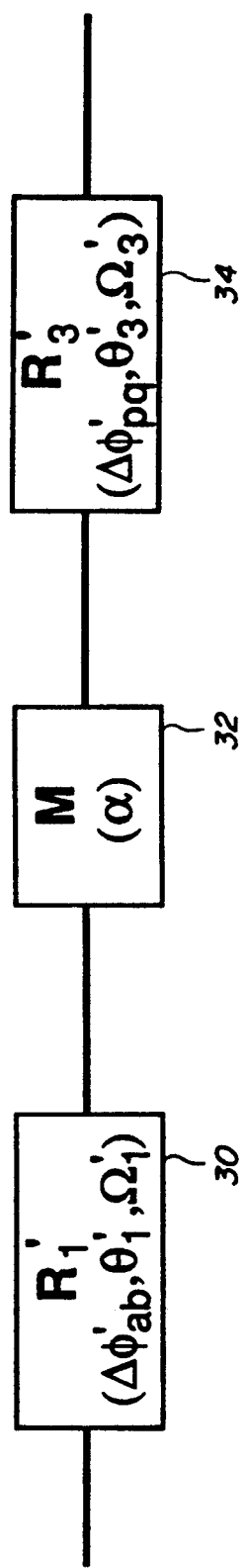
FIG. 7a is a block diagram of a birefringence model with three lumped element sections.

The resulting model is shown in FIG. 7a with three lumped element sections, section 1 at 30, section 2 at 32 and section 3 at 34, representing the three fiber lengths identified above. This is a seven parameter model, which is more complicated than is necessary, so it may be reduced to a more manageable four parameter model.

Figure 7B:
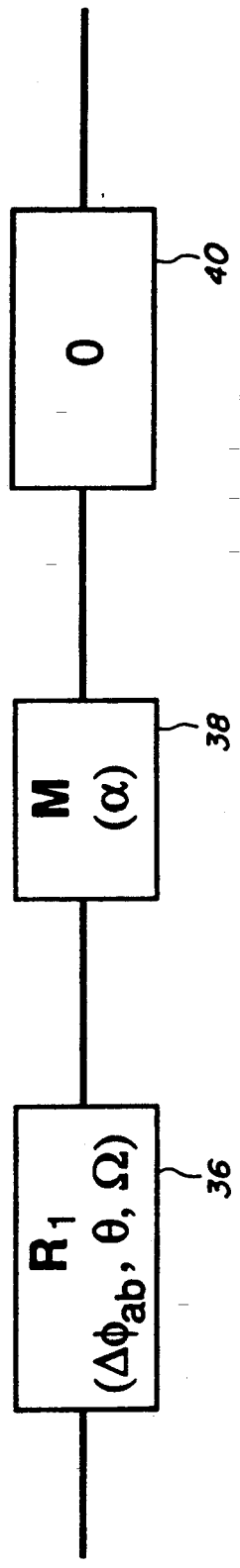
FIG. 7b is a block diagram of a reduced model with birefringence of end sections lumped into a single end.
Figure 7C:
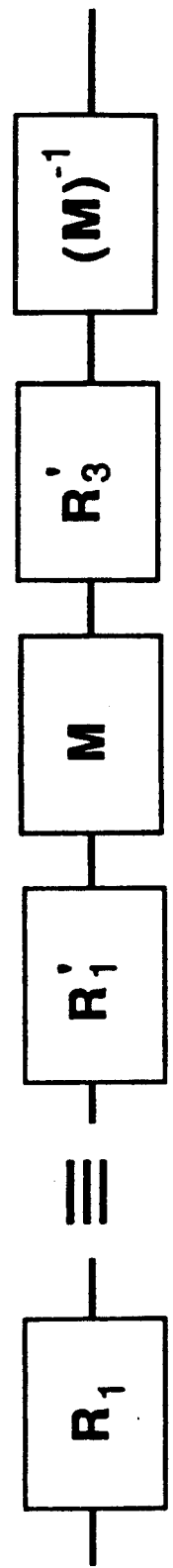
FIG. 7c is a block diagram showing equivalents between the lumped birefringence parameters of FIGS. 7a and 7b.

To achieve this, recall the following experimental observations: all output states can be achieved by adjusting the polarization controller at either fiber end and in the middle of the fiber; 2) whatever adjustment can be achieved with the controller at one end of the fiber can be exactly reversed by the controller at the other end of the fiber. These observations imply that the effect of the controllers at the fiber ends is interchangeable and that an adequate model could be provided by lumping the birefringence of both end sections into a lumped birefringence at one end. This would leave the other end to have zero birefringence parameters. This model is indicated in FIG. 7b where section 1 at 36 has new lumped (unprimed) constants and section 2 at 38 is unchanged. Section 3 at 40 now has zero birefringence. The equivalence between the new lumped birefringence parameters of section 1 and the birefringence parameters of the original model of FIG. 7a is shown in FIG. 7c. Here M is the inverse of the matrix M. The new section 1 at 36 parameters can be changed by adjusting either end, and are also effected by changes in o. The final model of FIG. 7b is a four parameter model. The parameters $a$, $\Delta\phi_{ab}$, $\theta$ and $\Omega$ and the matrices M and R are discussed in more detail below.

The birefringence model just derived is based on Jones' theory which, as mentioned above, applied to monochromatic light. Since fiber gyroscopes commonly employ broadband sources such as SLD's, group delay effects are expected to play a role, even when using ordinary fiber. Group delay effects in fiber coils have been treated rigorously in several places. See S. C. Rashleigh and R. Ulrich, Opt. Lett. 3, 60 (1978); J. I. Sakai, S. Machida, and T. Kimura, IEEE J. Quantum Electron OE-18, 488 (1982); and Burns, Chen and Moeller, cited above. The analysis is straightforward in the end sections where polarization mode coupling does not play a role and the usual quasi-monochromatic theory can be employed. See M. Born and E. Wolf, Principles of Optics, 3rd ed, New York: Pergamon 1965, pp. 491-506. However, in the central mixing section where polarization mode coupling dominates over a long length, the problem becomes one of modeling distributed random birefringences. Depolarization in long lengths of ordinary fiber has been observed and qualitatively modeled. See W. K. Burns, R. P. Moeller and C.-L Chen, J. Lightwave Tech. LT-1, 44 (1983). More sophisticated theoretical analyses appear in J. Sakai, J. Opt. Soc. Am. A1, 1007 (1984); and H. Shangyuan, L. Zongqi, and F. Weimin, J. Lightwave Tech. LT-4. 22 (1986). Since the very simple model described here for the central fiber section is a single lumped scattering center, the fiber length of that section has effectively been removed from the problem, and cannot account for coherence effects resulting from group delay differences in a rigorous way. However coherence effects in the central section undoubtedly play a role so varying group delays are built into the model in an ad hoc way. Obviously the value of such an approach is that the very complicated details of mode coupling in the center of the fiber can be ignored; and the utility of the model will depend on agreement with experiment.

Figure 8A:
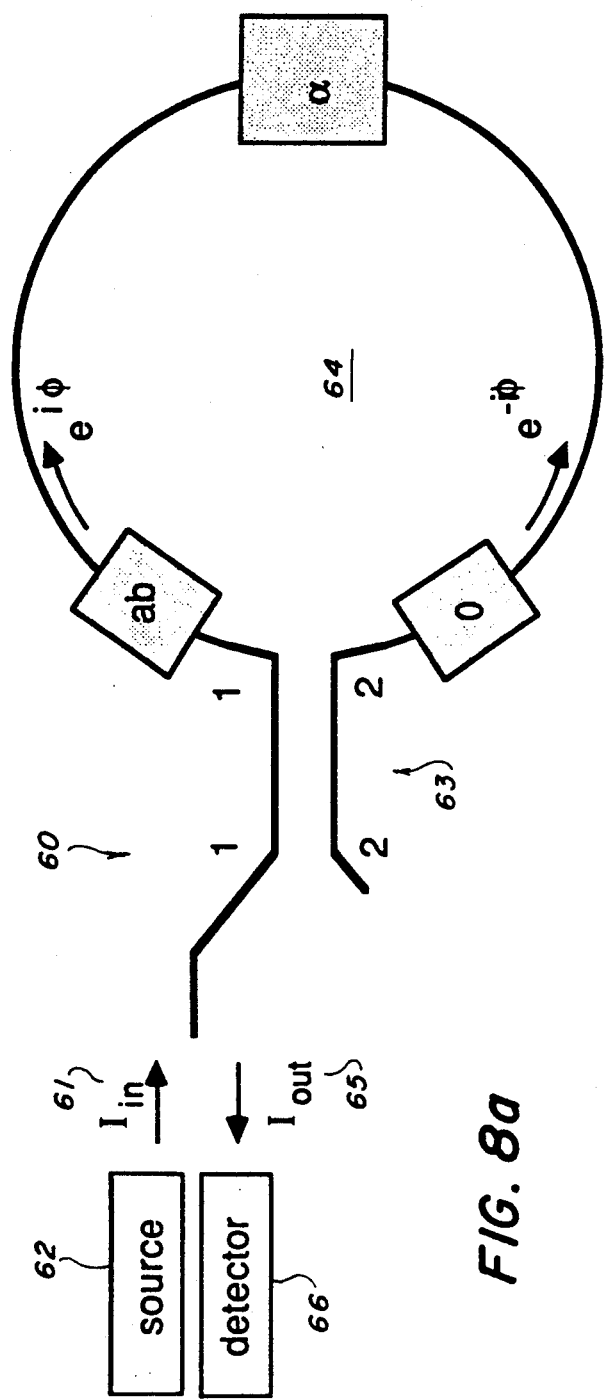
FIG. 8a is a schematic diagram of an arrangement used for a gyro output equation calculation.
Figure 8C:
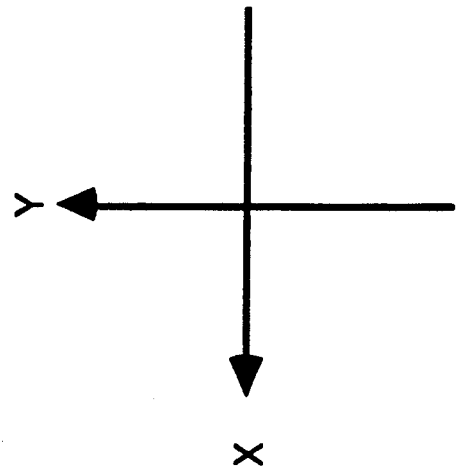
FIGS. 8b and 8c show an x-y reference frame for a fiber at each end of the input coupler.
Figure 8B:
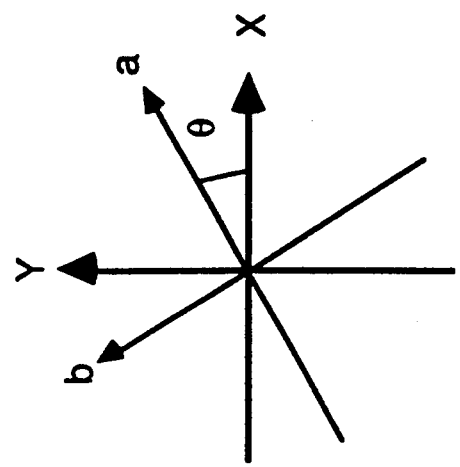

The output equation for a fiber gyroscope operating with depolarized light is derived. Consider the arrangement 60 of FIG. 8a. Light 61 from depolarized source 62 is incident on side 1 of a 2×2 coupler 63 input to the gyro coil 64. The gyro signal is taken as the light 65 intensity returning to the detector 66. The 2×2 directional coupler is assumed to be 3 dB and isotopic with respect to polarization. The Sagnac phase shift is $2\phi$. Assume an x-y frame of reference for the fiber with x in the plane of the coil and y perpendicular to the coil plane. These axes are shown at the fiber coil ends 1 and 2 in FIGS. 8b and 8c, respectively viewed from the coupler. Note that the x axis reverses direction as the frame is taken from position 1 to position 2. At 1 the axes a,b of the linear birefringences at the fiber end are also shown, where $\theta$ designates the fast axis orientation. The circular birefringence is assumed to follow the linear birefringence.

Transmission in the fiber is represented by the Jones matrix (see Pavlath and Shaw, cited above) as follows:

$$F_{21} = \begin{bmatrix} f_{x2x1} & f_{x2y1} \\ f_{y2x1} & f_{y2y1} \end{bmatrix} \tag{1a}$$

for propagation from 1 to 2, and by $$F_{12} = \begin{bmatrix} f_{x1x2} & f_{x1y2} \\ f_{y1x2} & f_{y1y2} \end{bmatrix} \tag{1b}$$

for propagation from 2 to 1. The fiber is assumed lossless so the transmission matrices are unitary. The matrix elements $f_{ij}$ are complex numbers representing the scattering coefficients of a four port linear system. Here the ports represent the x and y linear polarization states at the end of the fiber. Assume reciprocity so that $f_{ij}=f_{ji}$. The gyro output is then given by:

$$I_{out} = \frac{1}{2}(1 + k\cos 2\phi) \tag{2a}$$

where the contrast factor k is given by:

$$k = \frac{1}{2} < |f_{xx}|^2 + |f_{yy}|^2 - 2Re(f_{y2x1}f^*_{x2y1}) > \tag{2b}$$

and $f_{xx}=f_{x1x2}=f_{x2x1}$, $f_{yy}=f_{y1y2}=f_{y2y1}$, and $<>$ signifies time average. Re means the real part.

Both positive and negative contrast factors are expected to be encountered so the factor k in Eq. 2a is replaced by $\pm|k|$ where $|k|$ is the visibility. However, for an interference problem (which is the addition of two fields) the sign in Eq. 2a must be positive, so Eq. 2a is written as:

$$I_{out} = \frac{1}{2}(1 + |k|\cos 2\phi) \tag{3a}$$

for $k>0$, $$I_{out} = \frac{1}{2}[1 + |k|\cos(2\phi + \pi)] \tag{3b}$$

for $k<0$. Eq. 3b shows the origin of the $\pi$ phase bias shift or 'inverted' output signal discussed above. It arises when the birefringence dependent contrast factor becomes negative.

The problem is now reduced to calculating the contrast factor for the cases of interest. A specific representation for F is developed. The Jones matrix for propagation in a linearly birefringent fiber section of length L is:

$$B_{ij}(L) = \begin{bmatrix} e^{i\beta_i(\omega)L} & 0 \\ 0 & e^{i\beta_j(\omega)L} \end{bmatrix} \tag{4}$$

where $\beta_i$, $\beta_j$ are the frequency dependent propagation constants along the axes i and j. The Jones matrix for an axis rotation by an amount 0 is:

$$S(\theta) = \begin{bmatrix} \cos\theta & \sin\theta \\ -\sin\theta & \cos\theta \end{bmatrix} \tag{5}$$

Figure 9:
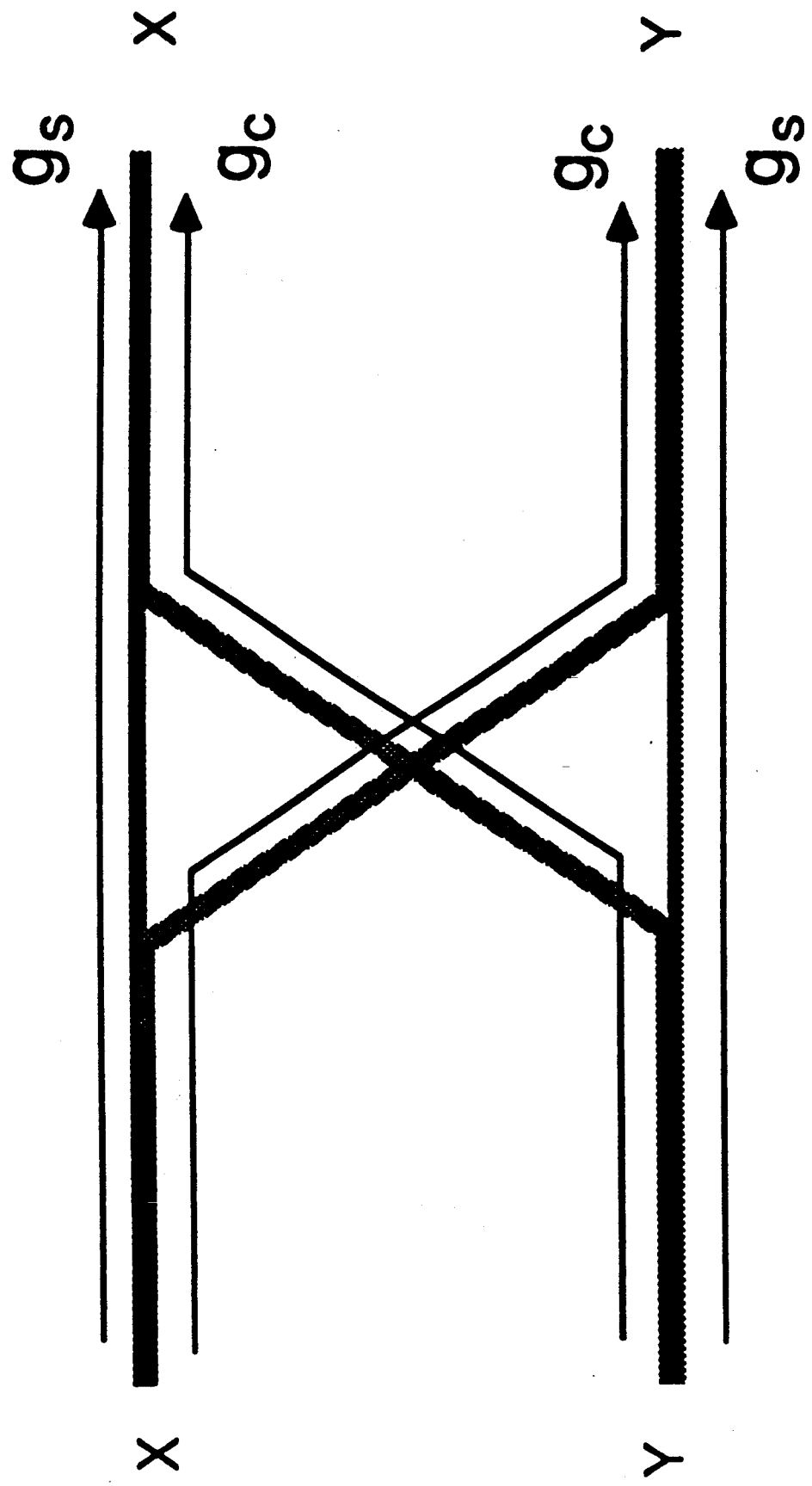
FIG. 9 shows schematically the group delays assumed in the central mode coupling section.

The matrix representing the mixing in the central section is expressed as:

$$M_{21} = \frac{1}{\sqrt{2}} \begin{bmatrix} g_s & g_c e^{i\alpha} \\ -g_c e^{-i\alpha} & g_s \end{bmatrix} \tag{6}$$

where $\alpha$ is the phase shift of the scattered light. As shown in FIG. 9 $g_s$ represents the group delay associated with straight paths through the mixing section, i.e., x to x or y to y; and $g_c$ represents the group delay associated with coupled paths through the mixing section, i.e., x to y or y to x. The term $g_s$ and $g_c$ are real. Using this representation the transmission matrix for the model of FIG. 7b is given by:

$$F_{21}=M_{21} S(-(\theta+\Omega)) B_{ab}(L_1) S(\theta) \tag{7}$$

for propagation from 1 to 2, where $\Omega$ is the rotation associated with the circular birefringence, which follows the linear birefringence in section 1. $L_1$ is the length of section 1. The matrix $R_1$ of FIG. 7b is represented by the product of the last three terms of the right-hand side of equation 7. Then the contrast factor from Eq. 2b is calculated, which yields:

$$k = \frac{1}{2} \{1 + \gamma\cos\alpha\sin 2(2\theta + \Omega) + \qquad (8)$$

$$\frac{1}{2}\sin 2\theta\sin 2(\theta + \Omega)(\cos 2\alpha - 1) +$$

$$\cos\Delta\phi_{ab}[\cos^2\theta\sin^2(\theta + \Omega) + \sin^2\theta\cos^2(\theta + \Omega)] +$$

$$\cos(\Delta\phi_{ab} - 2\alpha)\cos^2\theta\cos^2(\theta + \Omega) +$$

$$\cos(\Delta\phi_{ab} + 2\alpha)\sin^2\theta\sin^2(\theta + \Omega) +$$

$$2\gamma\sin(2\theta + \Omega)[\cos(\Delta\phi_{ab} + \alpha)\sin\theta\sin(\theta + \Omega) -$$

$$\cos(\Delta\phi_{ab} - \alpha)\cos\theta\cos(\theta + \Omega)]\}$$

where $\Delta\phi_{ab} = (\beta_a - \beta_b) L_1$, assuming that both $\Delta\phi_{ab}$ and $\Omega$ are independent of , i.e., that group delay effects do not play a significant role in the end section; and $\gamma$ is the coherence function in the central section defined by:

$$<g_i g_j> = \begin{cases} 1 & i = j \\ \gamma & i \neq j \end{cases} \qquad (9)$$

The coherence function $\gamma$ will assume values between 0 and 1 depending on whether group delay effects in the central section are important or not.

The particular solutions of Eq. 8 that account for the experimental observations can now be investigated. Eq. 8 has two $k = +1$ solution which are independent of the settings of the center section. First for $\Omega = \theta = 0$, Eq. 8 becomes:

$$k = \frac{1}{2}[1 + \cos(\Delta\phi_{ab} - 2\alpha)]. \qquad (10)$$

Eq. 10 shows that for any value of (any position of the center controller), a value of $\Delta\phi_{ab}$ may be chosen such that $k = 1$, which would be consistent with the experimental observations. For $\theta = 0, \Omega = \pi/2$ or $3\pi/2$, Eq. 8 becomes:

$$k = \frac{1}{2}(1 + \cos(\Delta\phi_{ab})) \qquad (11)$$

so that for $\Delta\phi_{ab} = 0$, $k = +1$ independent of $\alpha$ and $\gamma$.

Next, $k = -1$ solutions of Eq. 8 are investigated. These all require particular values of $\theta$, $\Omega$, $\Delta\phi_{ab}$ and $\alpha$, which requirement is consistent with experimental observations that all controllers had to be set precisely to obtain $k \sim -1$. For $\Omega = 0$, $\theta = \pi/4$, $\Delta\phi_{ab}\alpha = \pi/2$, Eq. 8 becomes:

$$k = -\gamma \qquad (12)$$

Eq. 12 shows that the contrast factor can vary between $-1$ and 0, depending on the value of the coherence function $\gamma$. There are two other such solutions. For $\alpha = 0$ and $\Delta\phi_{ab} = \pi$, Eq. 8 becomes:

$$k = \gamma\sin 2(2\theta + \Omega) \qquad (13)$$

so that $k = -1$ for $\gamma = 1$ and $2(2\theta + \Omega) = 3\pi/2$. A similar $k = -1$ solution is obtained for $\alpha = \pi$, $\Delta\phi_{ab} = \pi$, $\gamma = 1$ and $2(2\theta + \Omega) = \pi/2$.

Figure 10B:
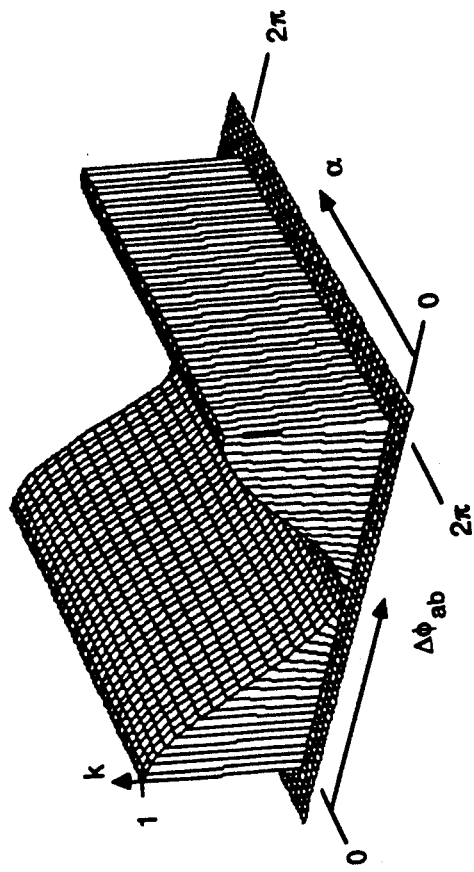
FIG. 10b is a three-dimensional graph of the contrast factor variation with $\Delta\phi_{ab}$ and $\alpha$ for $\phi=0$, $\Omega=\pi/2$.
Figure 10A:
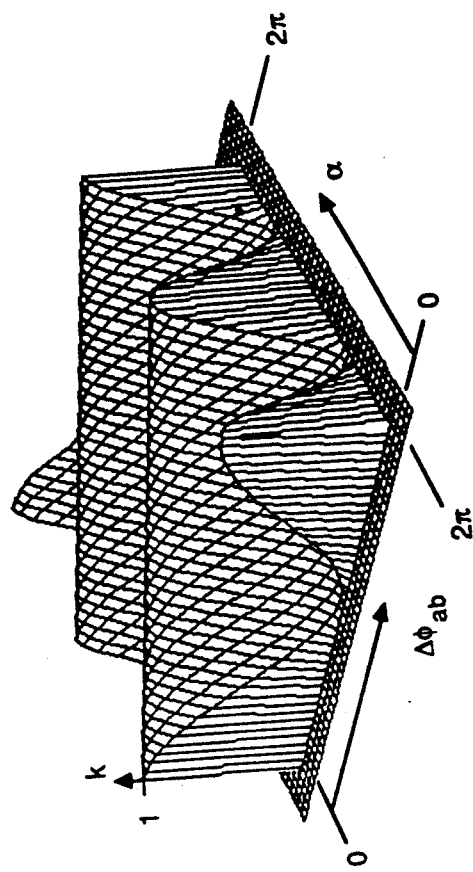
FIG. 10a a three-dimensional graph of the contrast factor variation with $\Delta\phi_{ab}$ and $\alpha$ for $\Omega=\theta=0$.
Figure 11B:
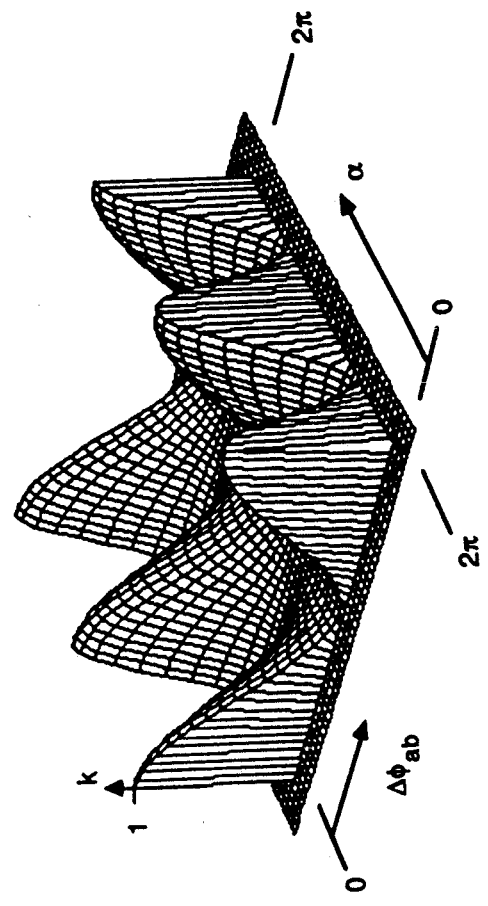
FIG. 11b is a three-dimensional graph of the contrast factor variation with $\Delta\phi_{ab}$ and $\alpha$ for $\theta=\pi/4$, $\Omega=0$ and $\gamma=0$.
Figure 11A:
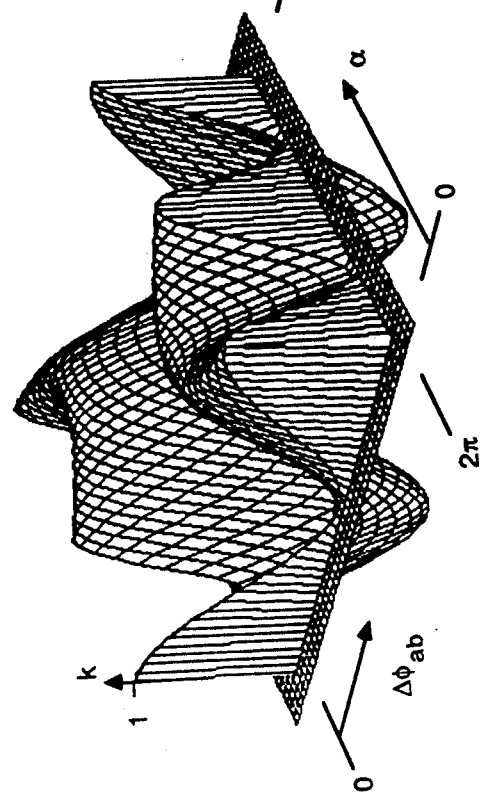
FIG. 11a is a three-dimensional graph of the contrast factor variation with $\Delta\phi_{ab}$ and $\alpha$ for $\theta=\pi/4$, $\Omega=0$ and $\gamma=1$.
Figure 12B:
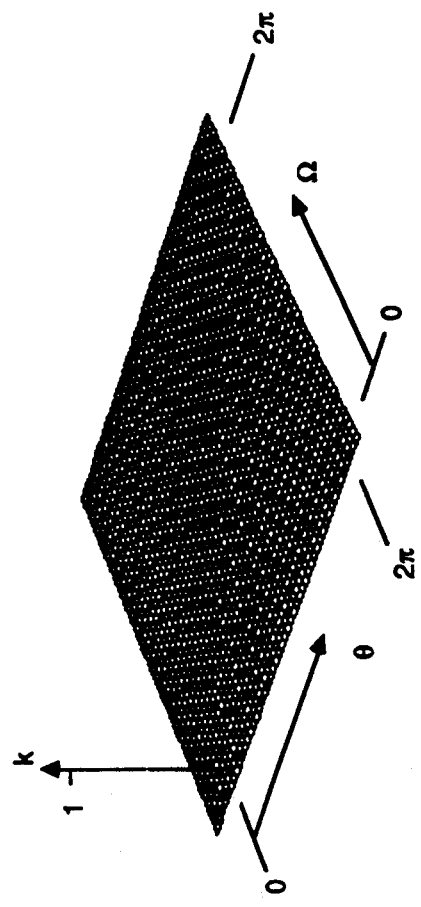
FIG. 12b is a three-dimensional graph of the contrast variation with $\theta$ and $\Omega$ for $\alpha=0$ and $\Delta\phi_{ab}=\pi$ and $\gamma=0$.
Figure 12A:
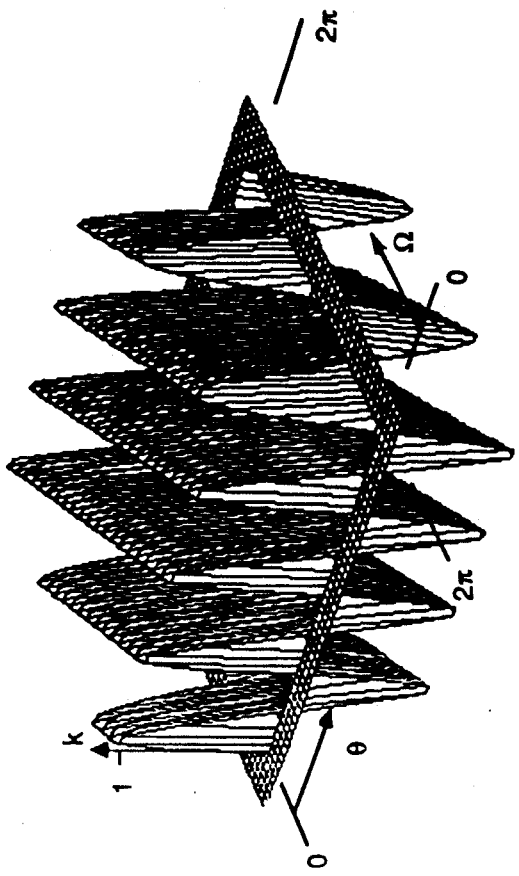
FIG. 12a is a three-dimension graph of the contrast factor variation with $\theta$ and $\Omega$ for $\alpha=0$ and $\Delta\phi_{ab}=\pi$ and $\gamma=1$.

Plots of these solutions are shown in FIGS. 10a, 10b, 11a, 11b, 12a and 12b. FIGS. 10a and 10b show the $k = +1$ solution which can be achieved independent of $\alpha$ and $\gamma$. FIG. 10a is a plot of Eq. 10 and FIG. 10b is a plot of Eq. 11. FIGS. 11a and 11b show the $k = -1$ solution corresponding to Eq. 12 (Eq. 8 for $\theta = \pi/4$ and $\Omega = 0$) for $\gamma = 1$ (FIG. 11a) and $Y = 0$ (FIG. 11b). FIGS. 12a and 12b show the $k = -1$ solution corresponding to Eq. 13 (Eq. 8 for $\alpha = 0$ and $\Delta\phi_{ab} = \pi$) for $\gamma = 1$ (FIG. 12a) and $\gamma = 0$ (FIG. 12b). These latter two figures show clearly that the $k < 0$ solution disappears as $\gamma \to 0$.

Consider the effect of a Lyot depolarizer in the loop. Physically the depolarizer could be placed between the sections 1 and 2 or between sections 2 and 3, but the latter is chosen so the transmission matrix calculated above can be used. Consider a two section Lyot depolarizer made of two lengths of polarization preserving fiber with their axes at 45° to each other. See W. K. Burns, J. Lightwave Tech. LT-1, 475 (1983). The fiber propagation constants are $\beta_r(\omega)$ and $\beta_s(\omega)$ along the fiber axes r and s. The fiber section lengths are $l_1$ and $l_2$ with $l_2 = 2l_1$. The first section is oriented at 45° to the x, y axes and the second section is oriented parallel to the x, y axes. The transmission matrix of the depolarizer, from end 1 to end 2, then becomes:

$$D_{21} = B_{rs}(l_2) S(-45°) B_{rs}(l_1) S(45°) \qquad (14)$$

where B and S are given by Eqs. 4 and 5. The elements of D are then:

$$D_{21} = \frac{1}{2}\begin{bmatrix} e^{i\beta_l l_1}(e^{i\beta l_2} + e^{i\beta l_2}) & e^{i\beta_l l_1}(e^{i\beta l_2} - e^{i\beta l_2}) \\ e^{i\beta_l l_1}(e^{i\beta l_2} - e^{i\beta l_2}) & e^{i\beta_l l_1}(e^{i\beta l_2} + e^{i\beta l_2}) \end{bmatrix}. \qquad (15)$$

The new fiber transmission matrix, with the depolarizer in place, becomes:

$$F'_{21} = D_{21} F_{21} \qquad (16)$$

where $F_{21}$ is given by Eq. 7. Assume the fiber lengths are long enough (for the source bandwidth) such that $\gamma(l_1) = \gamma(l_2) = 0$, where $\gamma(l)$ is the degree of coherence associated with section 1. Then calculate using Eq. 1a the following:

$$<|f'_{xx}|^2> = \frac{1}{2}(<|f_{xx}|^2> + <|f_{y2x1}|^2>) = \frac{1}{2} \qquad (17a)$$

$$<|f'_{yy}|^2> = \frac{1}{2}(<|f_{yy}|^2> + <|f_{x2y1}|^2>) = \frac{1}{2} \qquad (17b)$$

$$<f_{y2x1} f^*_{x2y1}> = 0 \qquad (17c)$$

where the unitary character of $F_{21}$ has been employed. Substituting in Eq. 2b yields the contrast factor with the depolarizer to be:

$$k = \frac{1}{2} \qquad (18)$$

which shows that all birefringence effects drop out. This calculation is independent of the particular birefringence model employed as long as $F_{21}$ is unitary.

First note that there can be a phase bias shift in the gyro output with unpolarized light. The bias shift has a value of $\pi$ and occurs when the contrast factor k becomes negative due to fiber birefringence effects. This has been observed experimentally as described above and is also verified as a consequence of the model discussed above.

This accounts for the experimentally observed differences in achieving contrast factors of +1 and −1, and accounts for the observed variation of negative contrast factors from 0 to ∼ −1 contrast factor could always be achieved experimentally by adjusting either end controller for any value of the center controller. This corresponds to the $k=+1$ solutions of Eqs. 10 and 11 (FIG. 10) which are independent of $\alpha$ and $\gamma$. However, $k=-1$ solutions could only be achieved by meticulous adjustment of both the center controller and the controller at one end. This corresponds to the $k=-1$ solutions of Eqs. 12 and 13 (FIGS. 11a, 11b, 12a and 12b) which require $\gamma=1$ and precise values of $\theta$, $\Omega$, $\alpha$ and $\Delta\phi_{ab}$. The variations of the negative contrast factor from 0 to ∼ −1 is a coherence effect which was shown to depend on the value of $\gamma$, which, in the model, characterizes coherence between light which mixes in the center section and light which does not. That $\gamma$ could be varied between 0 and 0.87. was observed, the latter number corresponding to the maximum negative contrast factor achieved. The maximum positive contrast factor was close to unity (0.97), which can be shown to be consistent with the assumption of frequency independent birefringences.

This model then accounts for the experimental differences in achieving the various contrast factors observed. A new feature here is the division of the fiber into different sections where the polarization mode coupling behavior is physically different, and describing the birefringence and coherence effects independently in each section. The description of the center section by a single unknown parameter (plus a coherence term), and the lumping of the end effects into a single end allows the simplest possible model which still accounts for the observed effects.

Finally, the Lyot depolarizer calculation is entirely consistent with the experimental observation of birefringence independent contrast factor. This calculation only depends on the unitary nature of F, and is independent of the particular birefringence model employed.

Thus a $\pi$ phase bias shift has been observed under certain coil birefringence conditions when depolarized light is used in a fiber gyroscope constructed with an ordinary low-birefringence fiber. By constructing a novel four parameter birefringence model to describe the fiber coil birefringence effects, experimentally observed differences in the occurrence of normal or inverted interference fringes with maximum visibilities can be explained. The birefringence model divides the fiber into three sections and explicitly accounts for polarization mode mixing in the center section. By additionally including a coherence term in the center section, visibility variations in the inverted fringe can be explained. These birefringence and coherence effects can appear as scale factor variations and have hindered the successful utilization of gyros with depolarized light. Also shown, experimentally and analytically, is that the insertion of a Lyot depolarizer in the gyro coil completely removes these birefringence and coherence induced scale factor variations, analogously to the elimination of polarization noise in gyros using polarized light.

Figure 13:
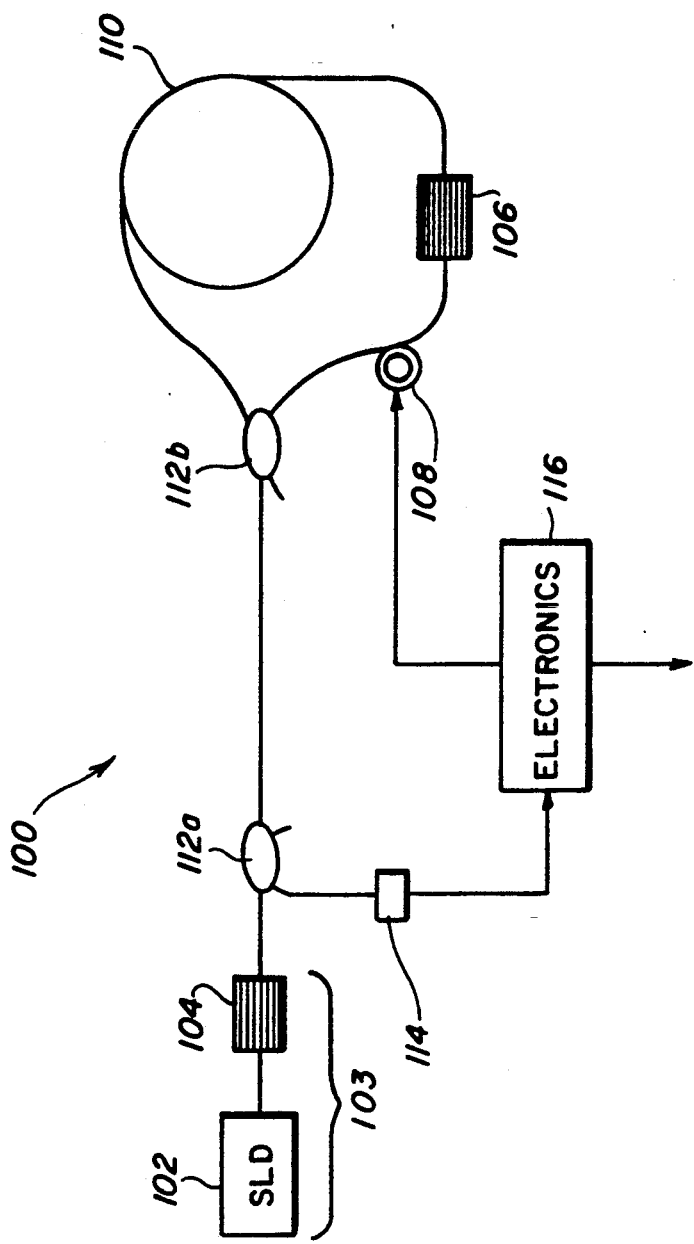
FIG. 13 is a schematic of a fiber gyroscope of the present invention.

FIG. 13 shows a novel fiber gyroscope 100 configuration operating according to the above-described newly discovered principles. In FIG. 13, light source 103 includes a general light source 102 and a source depolarizer 104, preferably a Lyot type depolarizer. General light source 102 is preferably a super luminescent diode (SLD) or a fiber superfluorescent source. When light source 102 provides depolarized light, the source depolarizer 104 is unnecessary. Light source 103 feeds coupler 112a with depolarized light. Coupler 112a feeds depolarized light directly to coupler 112b where the light is split into two partial lights travelling in counter rotating directions in gyro coil 110. Interposed between one end of gyro coil 110 and coupler 112b is a coil depolarizer 106 and a phase modulator 108. Persons skilled in the art will appreciate that the phase modulator 108 is provided for the benefit of the detector 114 and read out electronics 116. The two counter circulating partial lights recombine in coupler 112b where the combined light is conducted to coupler 112a and a portion of the combined light reaches detector 114 to produce a signal which is passed to gyroscope electronics 116. It will be appreciated by persons skilled in the art that a gyroscope electronics provides the drive signal to modulate the phase modulator 108 as well as detecting the phased interference signal from detector 104 synchronously with the phase modulation induced by phase modulator 108. The gyroscope electronics then produce a signal output proportional to the rate of rotation about an axis through gyro coil 110.

Figure 14:
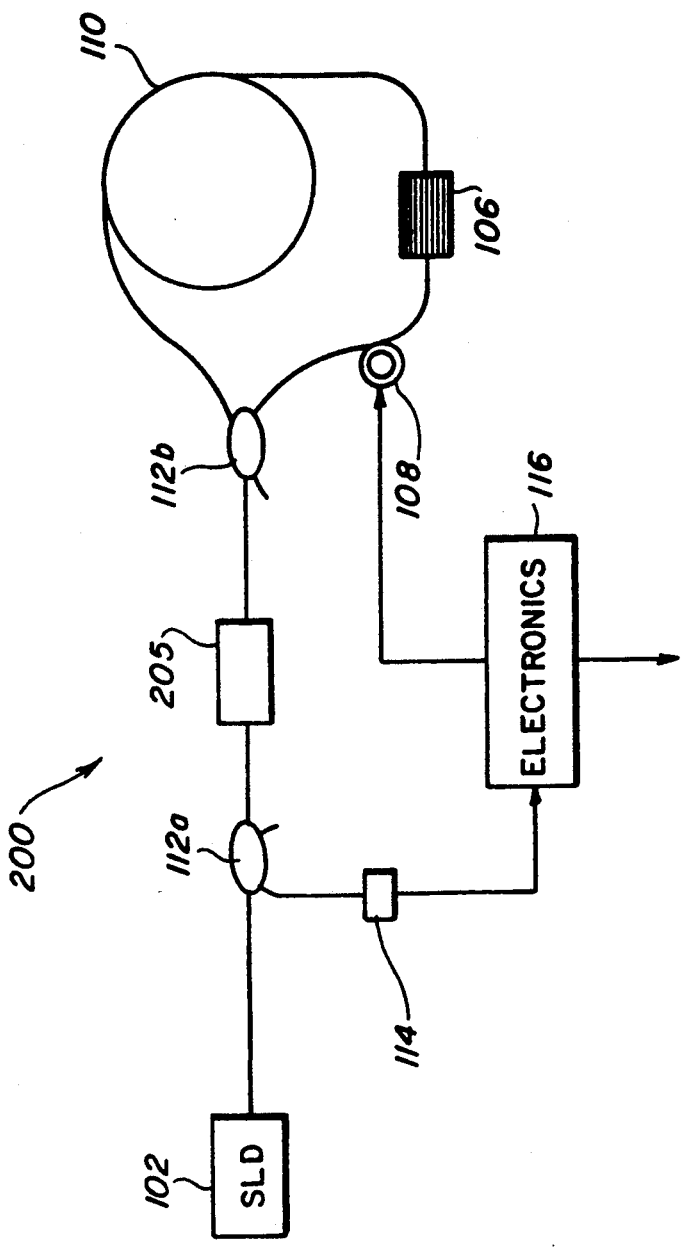
FIG. 14 is a schematic of a conventional fiber gyroscope.

If the light source 102 is only naturally partially depolarized, it is passed through source depolarizer 104, for example, a fiber Lyot type depolarizer, to produce depolarized light. No polarizer is used between couplers 112a and 112b since it is desired that a depolarized beam be maintained therebetween. The coil depolarizer 106 is again used to eliminate birefringence induced scale factor variations, even though the beam is already depolarized. The use of this component in the coil to eliminate such scale factor variations has not been recognized in the art. Bohm et al., Electron. Lett. 17, 352 (1981) have realized that with the polarized input (rather than the depolarized input from source 103 of the present invention), the use of a Lyot type coil depolarizer in the coil will eliminate polarization fading of the signal; however, this is different than the elimination of birefringence induced scale factor variations which occur in the depolarized case. This prior configuration is shown in the fiber gyroscope 200 of FIG. 14. In FIG. 14, gyroscope 200 includes polarizer 205 interposed between coupler 112a and 112b.

Figure 15:
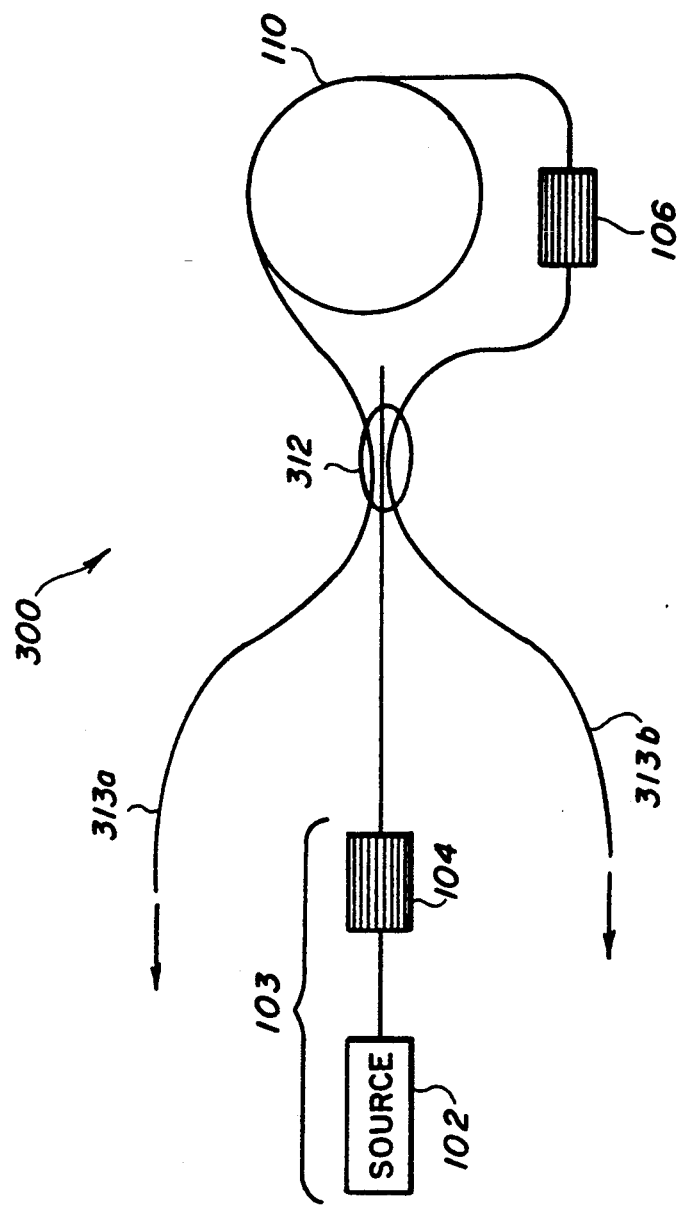
FIG. 15 is a schematic of an alternative fiber gyroscope of the present invention.

The principles of this invention apply to gyroscopes using both a pair of 2×2 couplers and gyroscopes using a 3×3 coupler. In FIG. 15, fiber gyroscope 300 uses a 3×3 coupler 312 in place of the two couplers 112a and 112b of FIG. 13. In FIG. 15, there is no need for phase modulator 108 as is used in the circuit of FIG. 13 since outputs 313a and 313b from coupler 312 are in a phase quadrature relationship. FIG. 15 represents a minimum component configuration for a fiber gyroscope including a depolarized light source 103, a 3×3 coupler 312, gyro coil 110 made from non-polarization preserving fiber, and coil depolarizer 106. Outputs 313a and 313b are detected and processed by known electronic means (not shown) to determine the rate of rotation of the gyro coil 110 about an axis through the gyro coil, the rate of rotation corresponding to the phase shift imparted in the optical signals 313a and 313b.

The advantages of the present invention allows the use of a depolarized source in a fiber gyroscope and does not require a polarizer between two 2×2 couplers. Previous uses of Lyot type depolarizers in fiber gyroscopes were intended to compensate for polarization fading at a polarizer or to compensate for the magnetic sensitivity that arose from using polarized light. The present embodiment is unique in that it uses depolarized light, eliminates the polarizer between couplers and employs a coil depolarizer to eliminate the instability common to depolarized gyroscopes, for example an instability from fiber birefringence induced scale factor variations. Prior art has not suggested this approach. This invention allows the use of low cost ordinary fiber in gyroscopes with a reduced component count. Further, since the polarizer is removed, there is a 6 dB improvement in optical power in the 2×2 coupler version which will increase power on the detector and thus sensitivity. In the 3×3 coupler version, this approach makes the 3×3 gyroscope practical for the first time.

This invention lends itself naturally to fiber superfluorescent sources which are naturally depolarized. Then the source depolarizer, usually a Lyot depolarizer, following the source is unnecessary. The 2×2 based gyroscope consists of the source, two couplers, the coil and one Lyot depolarizer. The 3×3 gyroscope requires only one coupler, the source, the coil and one Lyot depolarizer.

U.S. Pat. No. 4,712,306 to Blake describes a method that eliminates magnetic sensitivity in the output signal by using a polarizer followed by a depolarizer after the polarizer. That approach is lossy and reduces signal strength and thus reduces sensitivity of the gyroscope. The present invention achieves the same insensitivity to magnetic fields without the use of either of these components; therefore, a more sensitive gyroscope is achieved.

Having described the preferred embodiments of a novel fiber gyroscope and depolarization mechanism and a method for reducing birefringence induced scale factor variations, it is noted that modifications and variations can be made by those skilled in the art in light of the above teachings. It is therefore to be understood that changes may be made in the particular embodiments of the invention disclosed which are within the scope and spirit of the invention as defined by the appended claims.

Having thus described the invention with the details and particulars required by the patents laws, what is claimed and desired protected by letters patent is set forth in the following claims:

1. A depolarized fiber optic gyro with a detector for detecting a rotation about an axis of rotation, the depolarized fiber optic gyro comprising:
    depolarized light source means for generating depolarized light;
    gyro coil means for conducting depolarized light about the axis of rotation, said gyro coil means including a coil of a non-polarization preserving fiber having first and second ends;
    depolarizer means with first and second ports for eliminating birefringence induced scale factor variations caused by said non-polarization preserving fiber, said first port of said depolarizer means being coupled to said first end of said gyro coil means; and
    coupled means without a polarizer for coupling said second end of said gyro coil means, said second port of said depolarizer means, said detector and said depolarized light source means.

2. The depolarized fiber optic gyro of claim 1, wherein said coupled means includes a phase modulator and wherein said coupler means is coupled to said second port of said depolarizer means through said phase modulator.

3. The deposited fiber optic gyro of claim 1, wherein said coupler means includes a 3×3 coupler.

4. The depolarized fiber optic gyro of claim 1, wherein said coupler means consists of a phase modulator, a first coupler and a second coupler directly coupled to said first coupler.

5. The depolarized fiber optic gyro of claim 1, wherein said depolarized light source means includes a superfluorescent light source.

6. A depolarization mechanism for a fiber optic gyro with a detector for detecting a rotation about an axis of rotation, a depolarized light source and using a non-polarization preserving fiber in a gyro coil having first and second ends, the depolarization mechanism comprising:
    depolarizer means having first and second ports for eliminating birefringence induced scale factor variations caused by said non-polarization preserving fiber, said first port of said depolarizer means being coupled to said first end of said gyro coil; and
    coupler means without a polarizer for coupling said second end of said gyro coil, said second port of said depolarizer means, said detector and the depolarized light source.

7. The depolarization mechanism of claim 6, wherein said coupler means includes a phase modulator and wherein said coupler means is coupled to said second port of said depolarizer means through said phase modulator.

8. The depolarization mechanism of claim 6, wherein said coupler means includes a 3×3 coupler.

9. The depolarization mechanism of claim 6, wherein said coupler means consists of a phase modulator, a first coupler and a second coupler directly coupled to said first coupler.

10. A method for reducing birefringence induced scale factor variations in a detected signal from a depolarized fiber optic gyro having a non-polarization preserving fiber coiled into a gyro coil with first and second ends and a coupler system without a polarizer coupled to the second end of the gyro coil, the method comprising the steps of:
    coupling a depolarizer between the first end of the gyro coil and the coupler system;
    injecting a depolarized light into the coupler system to form without polarization first and second lights;
    conducting the first light of the depolarized light from the coupler system through the gyro coil and then through the depolarizer back into the coupler system as a first return light;
    conducting the second light of the depolarized light from the coupler system through the depolarizer and then through the gyro coil back into the coupler system as a second return light; and
    detecting the detected signal by superposing the first and second return lights.

* * * * *